April 7, 1931.  A. E. RUTTER  1,799,191
TUCKER FOR HAY PRESSES
Filed Feb. 17, 1927
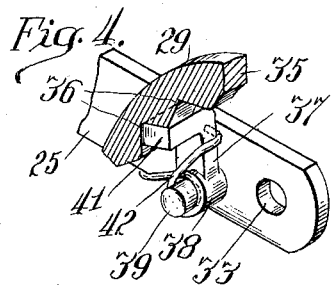
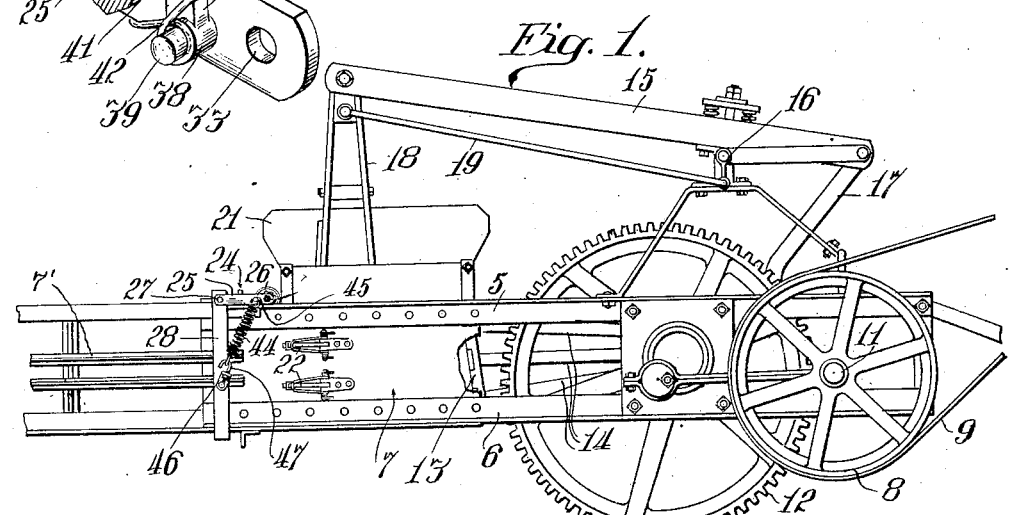
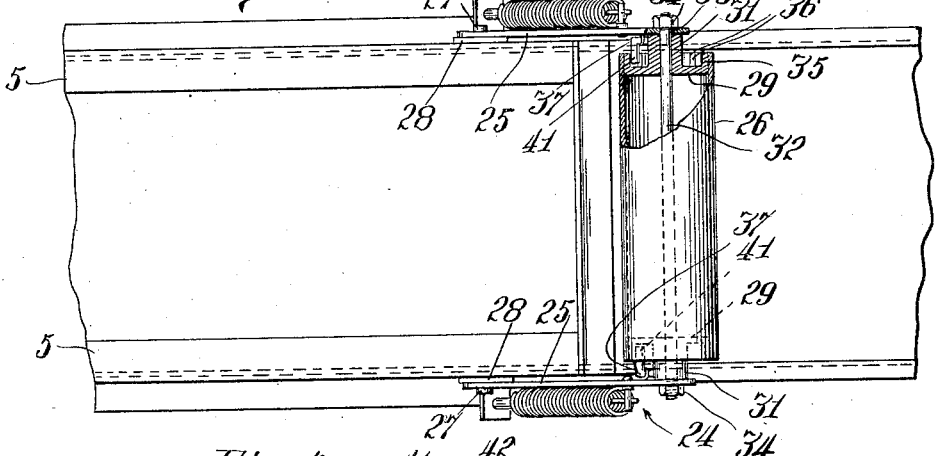
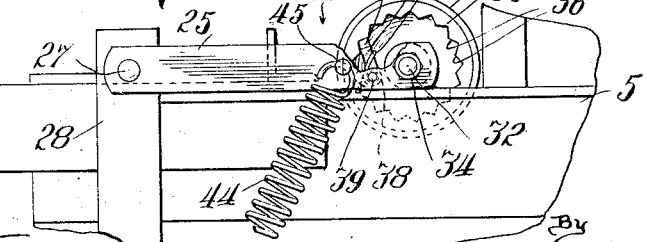
Inventor
Alvah E. Rutter,
John L. Jackson,
By
Attorney
Witness
Milton Lenoir Patented Apr. 7, 1931

1,799,191

UNITED STATES PATENT OFFICE

ALVAH E. RUTTER, OF OTTUMWA, IOWA, ASSIGNOR TO DAIN MANUFACTURING COMPANY OF IOWA, OF OTTUMWA, IOWA, A CORPORATION OF IOWA

TUCKER FOR HAY PRESSES

Application filed February 17, 1927. Serial No. 168,929.

The present invention relates generally to tuckers for hay presses, such devices being commonly provided on baling presses for tucking in the projecting ends of the hay between successive charges.

More specifically, the invention pertains to a roller tucker and aims to provide an improved and simplified construction of tucker of this type, and an improved arrangement of ratchet mechanism cooperating with the roller.

What I regard as new is set forth in the appended claims.

In the accompanying drawing illustrating a preferred embodiment of my invention:

Figure 1 is a fragmentary side elevational view of a hay press, illustrating the present tucker in operative position thereon.

Figure 2 is a fragmentary plan view of the press on a larger scale, part of the tucker roller being illustrated in section.

Figure 3 is a detail elevational view of the tucker, one of the swinging arms being broken away to illustrate the position of one of the ratchet dogs, and Figure 4 is a detail perspective view also illustrating the mounting of these ratchet dogs.

Referring to Figure 1, wherein I have shown a conventional type of hay press for illustrating a typical adaptation of my improved tucker, 5 and 6 indicate upper and lower frame members of a series of four frame members defining a rectangular bale chamber 7, having closed side and bottom walls. Extending rearwardly in continuation of this bale chamber is an open rectangular frame defining the usual compressing chamber 7'. Upon the forward portion of the frame 5—6 is mounted gearing of any suitable arrangement for actuating the plunger and self-feeder. In the typical construction shown, 8 is a pulley with which any suitable operating power is connected by a belt 9. Upon the shaft 11 of this pulley is mounted a pinion which is in driving mesh with a large gear 12. The plunger, indicated at 13, is connected by bars 14 to a wrist pin (not shown) projecting from the side of the large gear. As this gear is revolved, the plunger 13 is caused to travel back and forth in the feed chamber portion of the baling case. A feeder arm 15 is pivoted at 16 upon brackets extending upwardly from the frame. A link 17 connects the feeder arm with the previously mentioned wrist pin on the large gear 12. Depending from the other end of the feeder arm 15 is a feeding head 18, the position of which, relative to the arm 15, is controlled by a link 19. The hay is inserted into the bale case through a hopper 21 having a feeding opening communicating with the top of the bale chamber and through which the hay is forced down into the latter. Mounted on the sides of the bale case are the usual retaining dogs or stops 22 for engaging the hay in a manner well known.

As above remarked, the hay press just described is merely representative of any conventional type of press, for the purposes of illustrating a typical adaptation, the present tucker being adaptable to practically any type of press.

This tucker, indicated in its entirety at 24, is mounted on the top of the frame or bale chamber 7 just at the end of the feed opening through which the hay is forced from the hopper 21 into the bale chamber. The tucker comprises two swinging arms 25—25 pivotally supported at opposite sides of the main frame, and a roller 26 which is rotatably mounted between the swinging ends of such arms. The arms are supported at each side of the bale case on pivots 27 carried by upright frame members 28 constituting parts of the main frame. As shown in Figure 2, the roller 26 consists of a hollow cylinder having its ends closed by drums or heads 29 pinned or otherwise secured therein. Each of these end heads is formed with a central hub portion 31, and extending through the bearing openings in these end hubs is a rod 32. The ends of this rod extend out through openings 33 in the ends of the arms 25, and are threaded to receive nuts 34 on the outer sides of the arms. The two arms 25 together with the rod 32 constitute a swinging bail for the tucker roller, the latter revolving about the rod 32 as an axle or spindle.

The end heads 29 of the roller are formed with outwardly extending peripheral flanges 35 in which are formed ratchet teeth 36 defining an internal ratchet wheel at each end of the roller. Cooperating with these ratchet wheels are dogs 37 which are pivotally connected on the inner sides of the swinging arms 25. As shown in Figure 4, each dog comprises a hub portion 38 which is rotatably mounted on a pivot stud 39 projecting inwardly from the arm. An inwardly bent nose 41 on the end of the dog engages in the ratchet teeth 36. This nose is yieldingly held in engagement with said teeth by a coil spring 42 which is looped around the end of the pivot stud 39 and which has its opposite ends hooked around the back edge of the dog and under the lower edge of the supporting arm. It will be seen from Figure 3 that the dogs at each end of the roller are so positioned as to prevent rotation of the roller when the bale compressing plunger is moving backwardly in its retractive movement. These ratchet dogs do not, however, appreciably interfere with rotation of the roller in the opposite direction during the forward compression stroke of the plunger.

Normally, the tucker is held in its lower position, illustrated in Figure 3, by tension springs 44 which connect at their upper ends to pins 45 extending from the sides of the arms 25. The lower ends of these springs have adjustable attachment to brackets 46 secured to the frame members 28 through threaded hook bolts 47, such hook bolts being adjustable relative to the brackets 46 for increasing or decreasing the tension of the springs 44. The action of these springs is to hold the tucker down in yielding engagement with the top of the frame with the arms 25 or any other suitable stop members engaging the tops of the frame members 5. It will be observed that in this position, the lower periphery of the tucker roller is disposed substantially in the path of the plunger 13.

In the forward stroke of the plunger the roller will revolve freely as the hay is forced under the same. At this time, the springs 44 will press the roller yieldingly against the top of the charge of hay being compressed, permitting upward swinging motion of the roller as the plunger passes below the same. In the retractive movement of the plunger the roller will move down behind the compressed charge of hay under the action of the springs 44, thus turning downwardly or tucking in the ends of the hay projecting from the upper part of this charge. In such retractive movement of the plunger, the roller is held against rotation by the ratchet mechanisms at the opposite ends thereof, which also aids in tucking in the projecting ends and preventing them from being drawn backwardly by the retractive movement of the plunger. In the next forward stroke of the plunger the tucked in ends will be compressed between the previous charge and the new charge being forced forward by the plunger.

It will be noted that by disposing each ratchet mechanism substantially within the confines of the end of the roller, and between the end of the roller and the adjacent supporting arm, a simple compact construction is obtained, and one in which there is a minumum possibility of hay becoming entangled in the ratchet parts and fouling the operation thereof. It will, of course, be understood that the present tucker is applicable to any type of baling press, whether it is used for hay, straw, alfalfa, excelsior or other like material.

What I claim as my invention and desire to secure by Letters Patent, is—

1. A tucker adapted for association with the bale chamber of a hay press, comprising a pair of pivotally swinging arms, a roller journaled between said arms, an internal ratchet wheel carried by said roller, and a dog having connection with one of said arms and engaging with said ratchet wheel.

2. A tucker adapted for association with the bale chamber of a hay press, comprising a pair of pivotally swinging arms, a roller journaled between said arms, an internal ratchet wheel at one end of said roller, a dog pivotally supported on the adjacent arm and engaging said ratchet wheel, and spring means cooperating with said swinging arms normally tending to move said tucker inwardly relatively to said bale chamber.

3. A tucker adapted for association with the bale chamber of a hay press, comprising a pair of pivotally swinging arms, a roller journaled between said arms, said roller having a recessed end, and ratchet mechanism contained within said recessed end.

4. A tucker adapted for association with the bale chamber of a hay press, comprising a pair of pivotally swinging arms, a roller journaled between said arms, an end head in said roller having an internally toothed peripheral flange defining a ratchet wheel, and a dog pivotally mounted on the adjacent arm and engaging in said ratchet wheel.

5. In a tucker adapted for association with the bale chamber of a hay press, in which bale chamber compressing means reciprocates, the combination of a pair of pivotally swinging arms, a shaft extending between the swinging ends of said arms, a roller mounted on said shaft, spring means connected to said arms tending to swing said roller into said bale chamber, said roller comprising heads set into its ends, each of said heads having a bearing boss engaging on said shaft and having a longitudinally extending peripheral flange provided with inwardly projecting ratchet teeth, dogs pivotally supported on each of said arms and engaging in said ratchet teeth at each end of the roller, and springs cooperating with said dogs for yieldingly holding the latter in said teeth, said ratchet teeth and dogs preventing axial rotation of said roller in the retractive movement of said compressing means.

6. A tucker adapted for association with the bale chamber of a hay press, comprising a tucking roller adapted to engage and tuck the material being baled, said roller having a hollow portion, movable supporting means for said roller comprising a shaft on which said roller is rotatably mounted, and mechanism operating to permit axial rotation of said roller on said shaft in one direction and to prevent such rotation in the other direction, said mechanism being substantially enclosed within the hollow portion of said roller whereby the material being baled is prevented from gaining access to and fouling said mechanism.

ALVAH E. RUTTER.